Dec. 7, 1954 A. V. MITCHELL 2,696,559

OSCILLATOR TRIGGERING CIRCUIT

Filed May 2, 1952 2 Sheets-Sheet 1

INVENTOR
ALEX V. MITCHELL
BY
Eyre, Mann & Burrows
ATTORNEYS

OSCILLATOR TRIGGERING CIRCUIT

Filed May 2, 1952 2 Sheets-Sheet 2

INVENTOR
ALEX V. MITCHELL
BY
Eyre, Mann & Burrows
ATTORNEYS

United States Patent Office 2,696,559

Patented Dec. 7, 1954

2,696,559

OSCILLATOR TRIGGERING CIRCUIT

Alex V. Mitchell, Bloomfield, N. J., assignor to Tung-Sol Electric Inc., Newark, N. J., a corporation of Delaware Application May 2, 1952, Serial No. 285,720

3 Claims. (Cl. 250—36)

The present invention relates to synchronizing circuits for television receivers and comprises an improved circuit for control of the vertical oscillator of a receiver by the synchronizing pulses. The new circuit provides precise vertical synchronizing as it insures that each successive vertical sweep will start its return trace after exactly the same time interval from the beginning of the six serrated pulses comprising each vertical pulse.

In the usual television receiving circuit a super-synch signal comprising horizontal, equalizing and vertical pulses is integrated by a low pass filter and applied to a vertical oscillator which is near the threshold of conduction. Small variations in the conduction threshold of the oscillator or the level of the super-synch signal results in inaccurate synchronizing with consequent poor interlace, appearing as "pairing" of the horizontal lines. The circuit of the present invention overcomes this difficulty by causing the leading edge of each serration of the vertical pulse to appear on the integrated signal as a definite pip, with the result that conduction starts each cycle after the same number of serrations. The pips on the wave form are obtained by providing in addition to the integrating network for the super-synch signal a differentiating network for the signal, the output voltage across which is added to the output voltage across the integrating network. The combined voltage is then impressed across the vertical oscillator of the receiver.

The invention will be better understood by reference to the accompanying drawing, of which—

Figure 1:
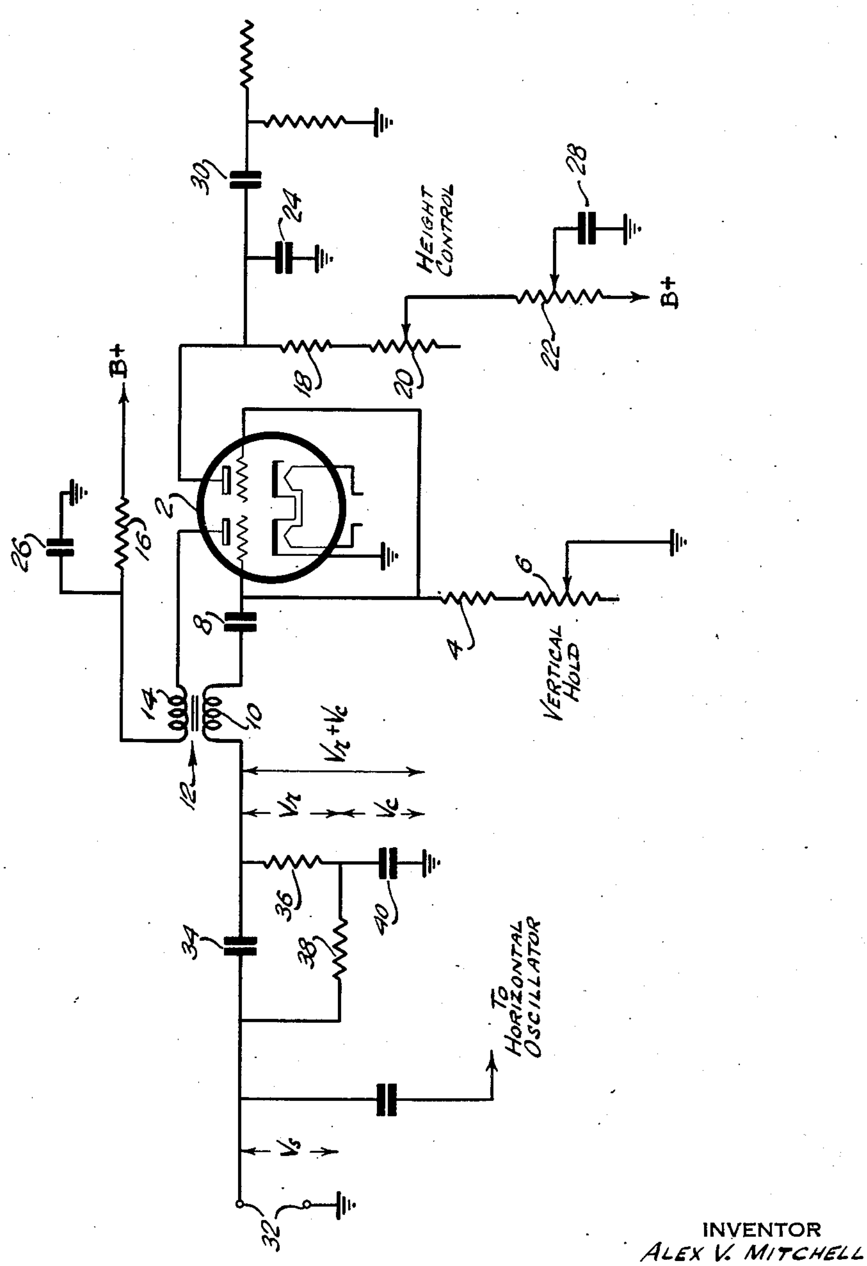

Fig. 1 is a circuit diagram of a vertical oscillator of a television receiver and of a synchronizing control circuit therefor embodying the invention; and Figs. 2, 3, 4 and 5 show the voltage wave forms at different parts of the circuit of Fig. 1.

In Fig. 1 a conventional oscillator of a television receiver is indicated as comprising the double triode 2, the first half of which comprising the blocking oscillator and the second half of which comprising the discharge tube. The control grids of the two halves of the tube 2 are tied together and connected to ground through resistor 4 and a controllable portion of resistor 6 comprising the "vertical hold." The grids are connected through a condenser 8 and winding 10 of transformer 12 with the signal circuit hereinafter described. The anode of the blocking oscillator is connected through the other winding 14 of transformer 12 and a resistor 16 with a source of positive potential indicated as B+ and the anode of the discharge tube is connected to B+ through resistors 18, 20 and 22 of which resistor 20 is adjustable, as indicated, to provide the "height control." A condenser 24, the slow charging of which through resistors 18, 20 and 22 during the time the oscillator is blocked and the rapid discharge thereof through the discharge tube during the short conduction period of the double triode provides the desired sawtooth sweep voltage, is connected between the anode of the discharge tube and ground. Condensers 26 and 28 in the anode circuits of the blocking oscillator and discharge tube respectively are provided for keeping alternating current out of the direct current source. The output of the oscillator is fed through a condenser 30 to the next tube of the receiver, the grid and grid resistor only of which are indicated in the drawing.

In accordance with the invention the triggering voltage impressed upon the control grids of tube 2 is obtained by integrating and differentiating the super-synch signal appearing at terminal 32 by a network comprising a condenser 34, resistors 36 and 38, and a condenser 40. Condenser 34 is connected between terminal 32 and winding 10 of transformer 12. Resistor 36 and condenser 40 are connected in series between the output side of condenser 34 and ground and resistor 38 is connected between the input side of condenser 34 and the junction of resistor 36 and condenser 40. Condenser 34 and resistor 36 together comprise a differentiating circuit which yields a voltage wave across resistance 36 which is the differential of the wave impressed upon terminal 32. Resistor 38 and condenser 40 together comprise an integrating circuit which yields a voltage wave across condenser 40 which is the integral of the wave impressed upon terminal 32. The voltage impressed upon the control grid of tube 2 is the sum of the voltage across resistor 36 and condenser 40.

Figures 2, 3, 4, 5:
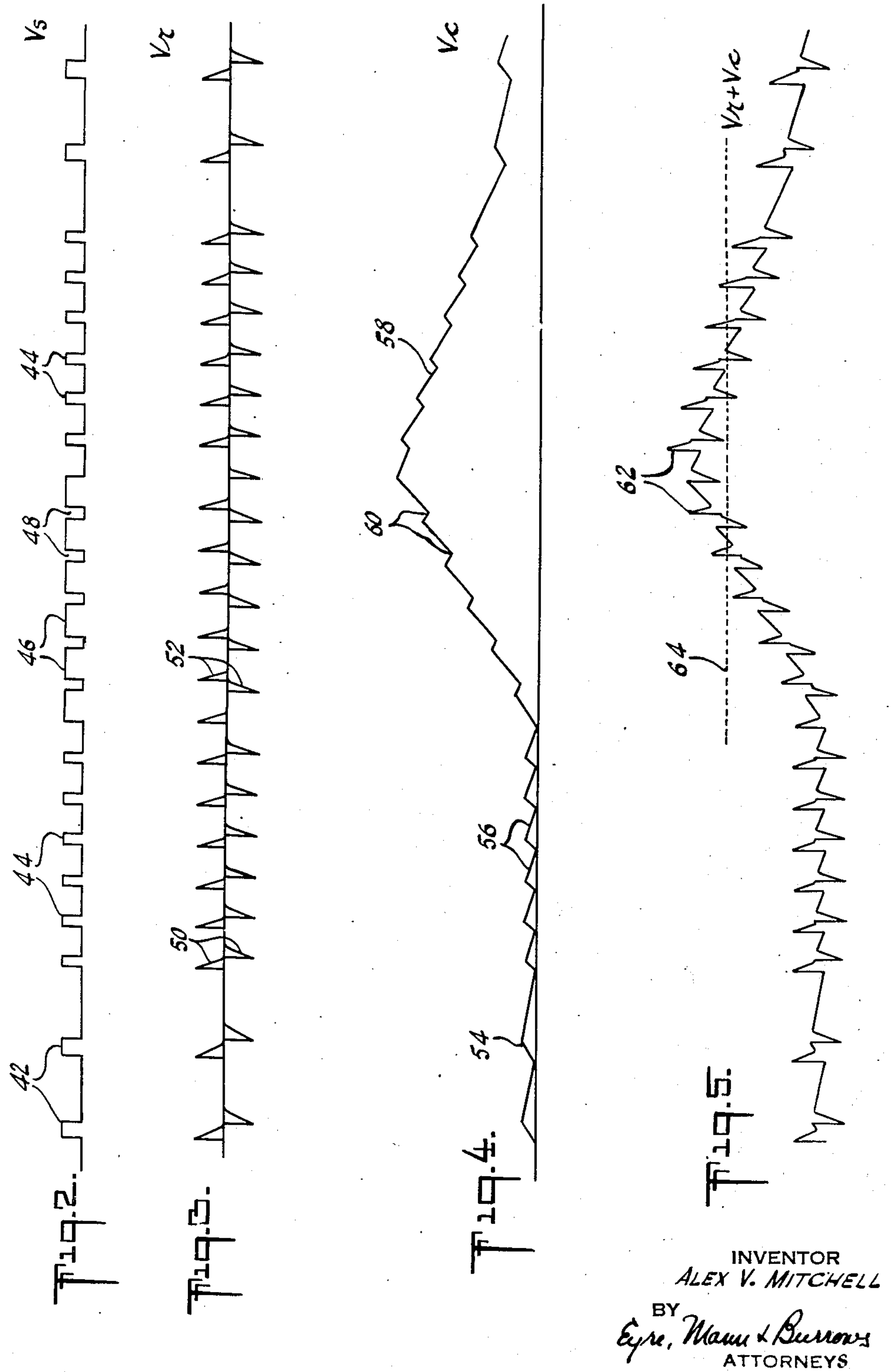

Reference may now be had to Figs. 2, 3, 4 and 5 which illustrate the various voltage wave forms and make clear the advantage of the new circuit. Fig. 2 is a representation of the super-synch signal $V_s$ impressed upon terminals 32 from the synch separator (not shown) of a television receiver. The signal includes the horizontal pulses 42, the equalizing pulses 44 and the vertical pulse 46 having serrations 48 therein. Fig. 3 is a representation of the differential of the wave of Fig. 2, and hence of the voltage $V_r$ appearing across resistor 36 of Fig. 1. In Fig. 3 each horizontal pulse and each equalizing pulse appears as a pair of sharp positive and negative pulses 50 corresponding to the leading and trailing edges of the pulses of Fig. 2. Similarly, the serrations of the vertical pulse of Fig. 2 cause the vertical pulse in Fig. 3 to appear as a series of positive and negative pulses 52. Fig. 4 is a representation of the integral of the wave of Fig. 2 and hence of the voltage $V_d$ across condenser 40 of Fig. 1. In Fig. 4 the horizontal pulses appear as small positive ripples 54 and the equalizing pulses as still smaller positive ripples 56. The serrated vertical pulse appears as a notched positive wave 58, the notches 60 being caused by the serrations 48. Fig. 5 represents the sum of the waves of Figs. 3 and 4 and hence the voltage $V_r+V_d$ impressed upon the oscillator of Fig. 1. In Fig. 5 the pips 52 of the differentiated wave of Fig. 3 are superposed upon the notches of the wave 58 of Fig. 4 yielding pulses or pips 62. With the wave form of Fig. 5, if the threshold of conduction of the oscillator is that of the dashed line 64, conduction will always occur at the fourth pip 62 of each vertical wave corresponding to the fourth serration of the super-synch signal. Slight variations in the threshold level, or in the amplitude of the super-synch level, will not vary the interval between the beginning of the vertical pulse and the triggering of the oscillator. Thus this form of wave provides a more positive control of initiation of oscillation and insures precise synchronization of the vertical sweep oscillator. The particular pip 62 which initiates conduction of the oscillator tube will depend, of course, upon the threshold level. Any pip will suffice, providing that it is the same one each cycle.

The invention has now been described with reference to one specific embodiment thereof wherein the simplest possible integrating and differentiating networks, each comprising but a single resistor and a single condenser, have been described. Obviously other and more complex known and integrating and differentiating networks could be employed if desired. Any such circuits that provide reasonable integrating and differentiation of the super-synch signal, and a differentiated signal whose amplitude is greater than that of each step in the integrated serrated pulses could be employed.

The following is claimed:

1. In a television receiving circuit of the type yielding a super-synch signal having serrated vertical pulses therein, the combination with the vertical oscillator of the circuit of a control circuit therefor comprising differentiating and integrating networks adapted to convert the serrated vertical pulses into a voltage wave having pips thereon spaced in accordance with the serrations in the original serrated pulses, and means for impressing said voltage wave upon said oscillator for initiation of conduction when a pip penetrates the threshold level, said differentiating and integrating networks comprising two resistors and two capacitors, one of said resistors being connected in series with one of said capacitors across the signal source and the other of said resistors and the other of said capacitors being connected in series across said first resistor, the voltage wave for control of said oscillator being developed across said second resistor and said first capacitor.

2. In a television receiver, a network for converting a super-synch signal of the type having serrated vertical voltage pulses therein into a control signal for a vertical oscillator, said network comprising means for integrating the super-synch signal, means for differentiating the super-synch signal and means for adding the integrated and differential signal to produce a control signal having spaced positive voltage waves with voltage pips thereon at intervals corresponding to the serrations of the vertical voltage pulses of the super-synch signal.

3. A network for converting super-synch television signals into a control signal for a vertical oscillator, which comprises a first circuit comprising a condenser and a resistor connected in series to yield across the resistor a voltage varying with the differential of the super-synch signal, a second circuit comprising a second resistor connected in parallel with said first circuit and a second condenser connected in series with said first circuit to yield a voltage across said second condenser varying with the integral of the super-synch signal, the sum of the voltages across said first resistor and said second condenser yielding the control signal for the vertical oscillator.

References Cited in the file of this patent

UNITED STATES PATENTS

| Number | Name | Date |
|---|---|---|
| 2,099,536 | Scherbatskoy | Nov. 16, 1937 |
| 2,508,923 | Mautner | May 23, 1950 |